(12) United States Patent
Spijker

(10) Patent No.: US 9,657,869 B2
(45) Date of Patent: May 23, 2017

(54) OPTICAL FIBER CABLE INSTALLATION IN A PRESSURE SEWERAGE

(75) Inventor: Johannes Gerhardus Spijker, Dedemsvaart (NL)

(73) Assignee: Jelcer-IP B.V., Dedemsvaart (NL)

( * ) Notice: Subject to any disclaimer, the term of this patent is extended or adjusted under 35 U.S.C. 154(b) by 606 days.

(21) Appl. No.: 14/113,147

(22) PCT Filed: Apr. 19, 2012

(86) PCT No.: PCT/NL2012/050266
§ 371 (c)(1),
(2), (4) Date: Dec. 30, 2013

(87) PCT Pub. No.: WO2012/144901
PCT Pub. Date: Oct. 26, 2012

(65) Prior Publication Data
US 2014/0202571 A1      Jul. 24, 2014

(30) Foreign Application Priority Data

Apr. 21, 2011   (NL) ...................................... 2006652

(51) Int. Cl.
| F16L 55/00 | (2006.01) |
| F16L 55/10 | (2006.01) |
| F16L 9/18 | (2006.01) |
| G02B 6/44 | (2006.01) |
| H02G 1/08 | (2006.01) |
| H02G 1/06 | (2006.01) |

(52) U.S. Cl.
CPC .............. *F16L 9/18* (2013.01); *G02B 6/4464* (2013.01); *G02B 6/4465* (2013.01); *H02G 1/06* (2013.01); *H02G 1/08* (2013.01)

(58) Field of Classification Search
CPC ........................................................ F16L 9/18
USPC ...................................... 138/90, 93, 94, 108
See application file for complete search history.

(56) References Cited

U.S. PATENT DOCUMENTS

| 4,648,744 A | 3/1987 | Knapp | |
| 4,856,937 A * | 8/1989 | Grocott | F17D 5/00 |
| | | | 254/134.4 |
| 4,917,539 A | 4/1990 | De La Salle | |
| 5,084,764 A * | 1/1992 | Day | G01M 3/005 |
| | | | 348/84 |
| 6,019,351 A * | 2/2000 | Allen | G02B 6/4464 |
| | | | 254/134.3 R |
| 2004/0118454 A1 | 6/2004 | Leppert | |
| 2004/0247264 A1 | 12/2004 | Beals | |
| 2009/0056122 A1* | 3/2009 | Allen | H02G 1/086 |
| | | | 29/868 |

FOREIGN PATENT DOCUMENTS

| EP | 0294243 | 12/1988 |
| EP | 0450814 | 10/1991 |

(Continued)

*Primary Examiner* — Vishal Pancholi
(74) *Attorney, Agent, or Firm* — Marcus C. Dawes; Daniel L. Dawes

(57) ABSTRACT

A house connection for a cable in a medium conduit comprises a cable passage with which the cable is taken out of the medium conduit. The cable passage is provided with a cable tensioner with which a portion of the cable can be tensioned in the medium conduit. The cable passage is preferably part of a rotatable manifold.

7 Claims, 8 Drawing Sheets

(56) References Cited

FOREIGN PATENT DOCUMENTS

| EP | 1011001 | 6/2000 |
|---|---|---|
| GB | 2312995 | 11/1997 |
| WO | WO-03/060585 | 7/2003 |

* cited by examiner

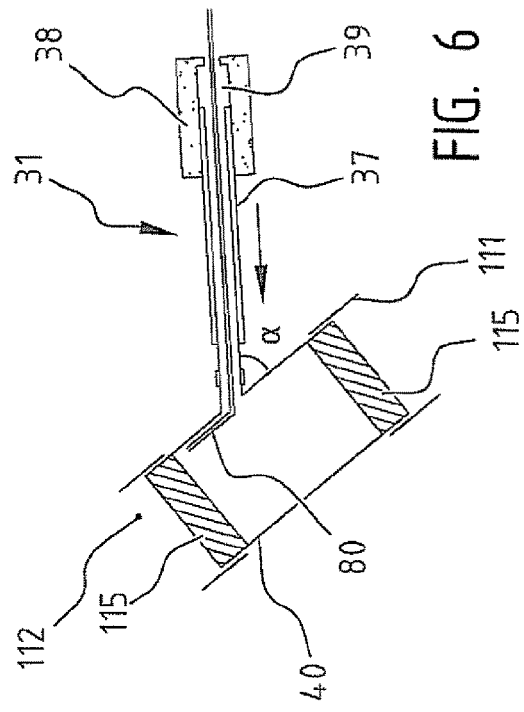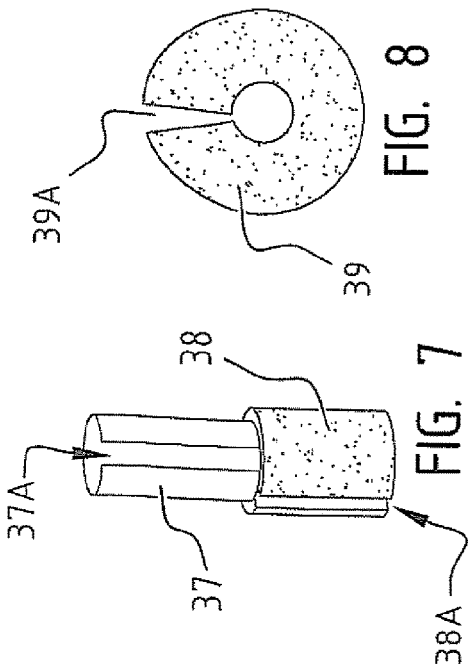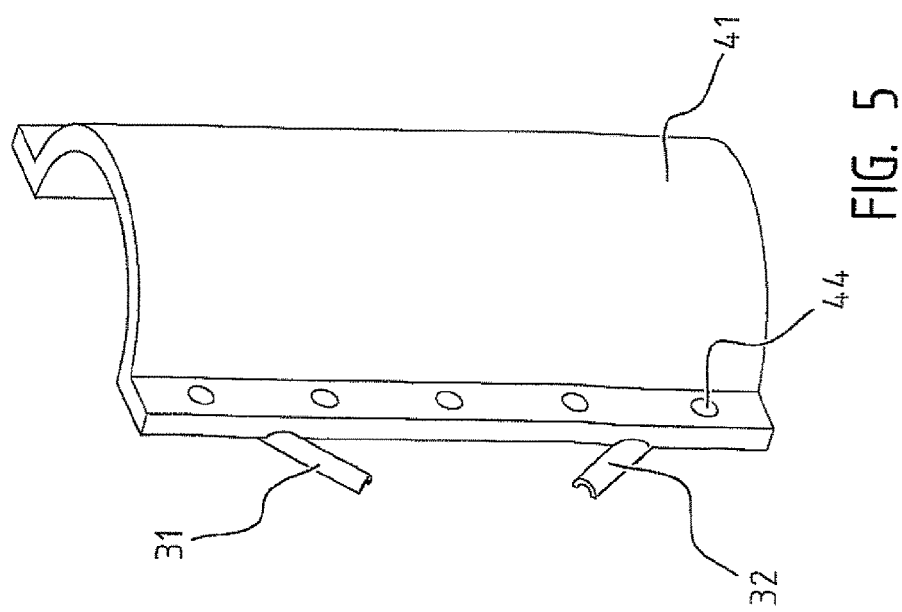

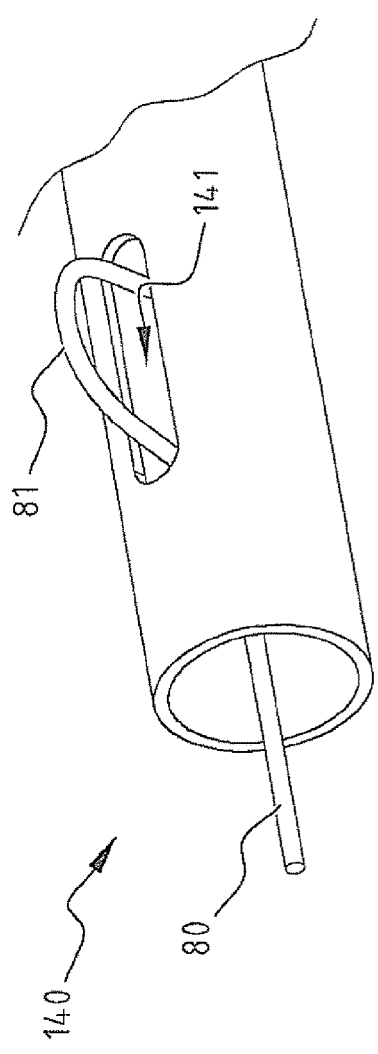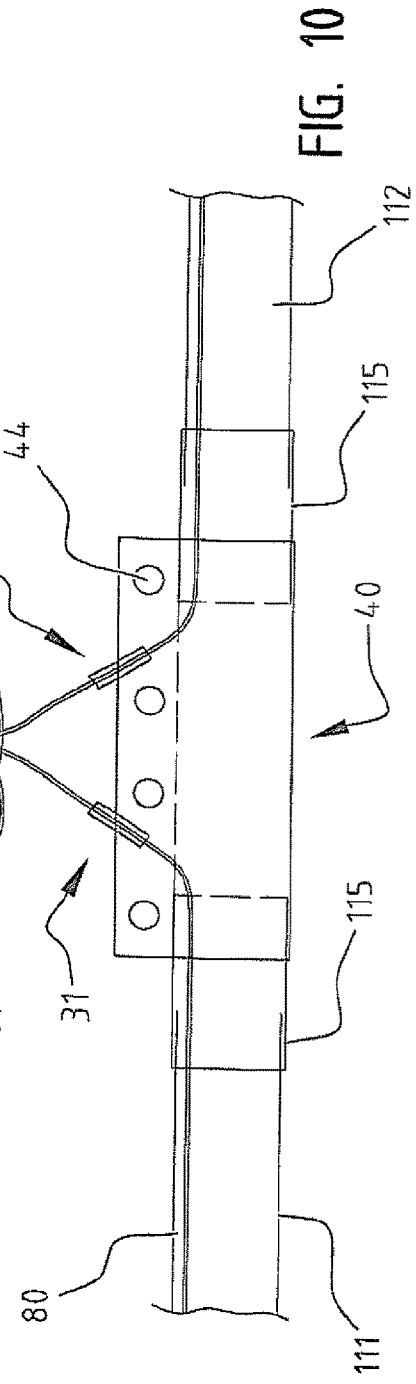

OPTICAL FIBER CABLE INSTALLATION IN A PRESSURE SEWERAGE

FIELD OF THE INVENTION

The invention relates to the laying of a cable in a medium conduit. The invention also relates to a thus obtained medium conduit provided with a cable. The invention further relates to auxiliary means for use herein.

BACKGROUND OF THE INVENTION

Cables for telecommunication, such as glass fibre cables in particular, are seen as the basis of a communication network. Efficiency requires that use be made of already existing pipe systems in the ground for the purpose of laying such a new cable network. A sewer forms a very suitable pipe network here. The sewer system in cities comprises a network of main sewers running below streets to which individual house sewers or house sewer connections are connected. The main sewer has a cross-section sufficiently large for a robot, and there are sewer drains through which a glass fibre cable can be introduced into the sewer. A method for laying a glass fibre cable in such a main sewer is per se known from EP 1868020.

In for instance an outlying area outside a city the number of connections to the sewer per kilometre is low. This causes too little flow in a normal sewer for the purpose of draining the sewer content. Use is thus often made of a pressure sewer. This is a pipe with a small diameter which is operated with a pressure pump such that the sewer content is actively pumped away. The house connection of a dwelling to a pressure sewer effectively consists of a catch pit which is emptied on a regular basis by pumping to the pressure sewer. As a result it is not possible to introduce a robot into an existing pressure sewer for the purpose of laying a glass fibre cable. Nor is it possible to simply open the pressure sewer in order to make a connection. It is further not possible to draw the glass fibre cable to a dwelling via a house connection of the sewer, but a bridging is necessary between a connection point in the pressure sewer and a further connection to the dwelling, such as for instance an inspection well.

The British patent application GB 2312995 discloses a solution for introducing a glass fibre cable into a medium conduit for a medium under pressure. This relates particularly to a water conduit or a gas conduit, with a pipe as primary component of the system. A cable is introduced into the pipe here together with a pulling member. The pulling member will pull the cable through the pipe. A spreadable and collapsible pulling member is used for a medium under pressure. The pulling member is provided for this purpose with suitable means, such as a collapsible screen. The screen absorbs the pressure and is in this way carried along with the flow in the pipe. Situated at a first longitudinal position where the cable has to be taken out of the medium conduit is a cable outlet. Situated at a second longitudinal position located a little further along (i.e. downstream) is a cable inlet with which the cable can once again be introduced into the pipe of the medium conduit. According to this British patent application, taking out the cable serves the particular purpose of circumventing obstacles in the medium conduit. In the case of a gas conduit this is for instance a closing valve.

It is however a drawback of the known medium conduit that the cable is situated inside the medium conduit at a position which cannot be determined. When the medium conduit transports something other than gas or liquid, such as in particular a pressure sewer, this can easily result in highly undesirable blockages. Not only must a blockage be cleared as quickly as possible, a blockage is also difficult to trace since the conduit is located under the ground and is optically non-transparent.

SUMMARY OF THE INVENTION

It is therefore an object of the present invention to provide a method with which a glass fibre cable network can also be arranged and connected via a pressure sewer.

This object is achieved in a method for arranging a cable in a pipe of a medium conduit suitable for transport of a medium using pressure, the method comprising the steps of
supplying liquid and/or applying pressure in at least a part of the medium conduit extending from a first point;
drawing the cable through the pipe of the medium conduit from the first point downstream to a second point, wherein the cable is carried along by the liquid and/or pressure in the medium conduit, wherein an outer end of the cable is taken out of the medium conduit at the second point;
opening an opening in the pipe at a first longitudinal position between the first and the second point;
taking a piece of the cable out at the first longitudinal position while forming a loop, and
closing the opening in the pipe with a manifold provided with a first cable passage, wherein the cable is passed through the cable passage, and
rotating the manifold to a protected position in which the cable passage and the cable carried outside are protected from damage by excavation work by means of the pipe or a shell arranged in a longitudinal opening between a first and a second pipe part of the pipe.

The object is further realized in a medium conduit suitable for transport of a medium using pressure and suitable for receiving a cable, which medium conduit comprises a pipe and is provided with a first cable passage at a first longitudinal position on the pipe, the cable passage being suitable for passage of the cable, so that a portion of the cable can lie outside the pipe at the first longitudinal position, wherein the first cable passage forms part of a manifold which is rotatable relative to an axis through the pipe between a protected position and a servicing position.

The object is also realized in a method for providing a house connection to the cable located in the medium conduit.

The use of a rotatable cable passage, typically in the form of a rotatable manifold, is particularly favourable when the medium conduit is, as is usual, laid in the ground. It is then advantageous that there is a servicing position, in which the opening and the passage are preferably on the upper side, and a protected position in which the passage lies on the underside. Once the pipe with the cable and the cable passages has been buried in the ground, there is a risk of the cable passage and/or the cable being damaged during excavation work. This risk is considerable, since excavation work is usually carried out by people not aware of the presence of the cable passage and/or the cable. Mistakes are made here in positioning during excavation work and use is made of auxiliary means which do not make allowance for the vulnerability of a cable, in particular a glass fibre cable.

The rotatable cable passage is part of a rotatable manifold. Such a manifold differs essentially from the saddle piece disclosed in the stated British patent application. This is because the saddle piece is on the upper side of the pipe and covers an underlying, limited hole. A hinge is provided for placing and securing the saddle piece around the pipe.

The invention is also based on the fact that a cable passage not only functions as passage for the cable from inside to outside and vice versa, but also that, owing to the cable passages between the first and second point, the location of the cable inside the pipe can be better controlled. The embodiments of the medium conduit according to the invention are highly suitable for controlling and modifying the location of the cable in the pipe.

The manifold preferably comprises a second cable passage in addition to a first cable passage, wherein a single piece of cable lies in each cable passage. This ensures that the cable is better guided, whereby there is less risk of breakage. Furthermore, the open surface area is hereby reduced compared to a situation with one cable passage, whereby there is less danger of leakage of medium to the outside. The formation of a cavity, in which accumulation of medium could occur, is also prevented.

The manifold is for instance embodied as two halves of a form such that the cable passage is created during assembly of the two halves. The cable passage is then embodied as a profile, wherein a mutual surface of the two halves extends in a longitudinal direction through the first cable passage. The two halves can be connected to each other here in appropriate manner in a releasable as well as non-releasable manner. It is noted that it is not necessary here for the two halves to be of the same size. A first half can for instance describe an arc of 200 degrees and the other half the complementary arc of 160 degrees.

In order to introduce the cable into the first cable passage it is placed in the first component of the manifold, after which the second component is secured to the first component with closing of the surface of the first cable passage in its longitudinal direction. Such a manifold is for instance part of a shell that is particularly placed over a pipe, but can also cover an opening in the pipe.

Alternatively, the manifold can be provided with a slot with a length in the axial direction of the pipe, this length of the opening being sufficient to form a loop in the cable, which slot is closable with a cover provided with the first cable passage and a second cable passage. Such a manifold is for instance part of a segment which can be placed in a longitudinal opening between a first and a second pipe part.

A longitudinal opening is preferably made in the pipe between a thus distinct first pipe part and second pipe part. The manifold is then placed in the longitudinal opening as component of a shell or segment. The shell or segment are then rotatable as a whole, for instance with sliding sleeves.

In a first embodiment the manifold is formed by a shell. In order to avoid lack of clarity it is noted that the term 'manifold' in the context of the present application is intended functionally as the system which extends in the pipe or as replacement of a portion of the pipe and in which the cable passage is integrated. The manifold need not therefore be a single component but can comprise a plurality of components of the same or different material. The term 'shell' is used for an essentially tubular means extending between pipe parts for the purpose of sealing a longitudinal opening. It cannot be precluded here that the shell might also extend partially along one or more of the pipe parts. This is not recommended however if the shell is intended to rotate in its entirety with the cable passage.

In another embodiment the manifold is embodied as a segment situated in the pipe or a shell. The segment is for instance arranged in an opening extending over a certain angle in the shell at the first longitudinal position. The cable passage can then be rotated inside the opening. The segment can be provided here with a slide which in one of the positions is partially concealed in the pipe. The segment is for instance embodied here in rubber or a combination of rubber and plastic material. The centre can also be annular and rotatable all around. The rotation can be limited here to one direction (i.e. to the left or right), if this enhances reliability and lifespan. It will be evident that embodiments are also possible wherein the segment can rotate in two directions, for instance by making use of sliding sleeves. Other constructions for making a rotatable ring are known to the skilled person.

In a favourable embodiment of the medium conduit the first cable passage is provided with a cable tensioner for tensioning a portion of the cable extending in the medium conduit from the first longitudinal position. A portion of the cable can hereby be tensioned. Such a portion extends for instance over a distance of 50 metres to 1 kilometre. It is not inconceivable for loops to occur or for play to occur during drawing of the cable in the pipe through said portion, for instance in bends. These loops are removed by tensioning the cable, so greatly reducing the risk of blockages. The portion of the cable for tensioning extends particularly from a first house connection to a previous or subsequent house connection, or the first or second point. The portion of the cable for tensioning can lie upstream as well as downstream of the first longitudinal position. During tensioning of a portion of the cable between a first and a second house connection the cable is typically first secured to the first house connection, then pulled taut and subsequently secured to the second house connection.

The cable tensioner particularly comprises a means with which the location of the cable is determined and is preferably used in combination with a means with which the cable is tightened. The means for fixing the cable is for instance a screw turnbuckle. For tightening of the cable use can be made of a motor, but also of a pulley or such auxiliary means. This means for tightening the cable need not be connected to the first cable passage.

Alternatively, pipes of medium conduits can be equipped with a groove intended for the cable. An auxiliary means such as a cable tensioner is then not necessary. Such a medium conduit pipe with groove otherwise appears to be particularly applicable in sewers when a cable has already been arranged before the sewer is taken into use.

It is recommended that the cable passage encloses an angle with the axis of the pipe of a maximum of 60 degrees. Favourable is an angle of 45 degrees or less, particularly favourable is an angle of about 30 degrees, for instance between 20 and 35 degrees. If the angle becomes too large, there is an increasing risk of a kink occurring in the cable. This is particularly the case when the cable is tensioned from the cable passage. If on the other hand the angle becomes too small, there is an increasing risk of leakage along the cable passage. This is particularly the case when use is made of a shell comprising two halves clamped fixedly to each other.

In a further embodiment an inspection well is arranged in the medium conduit at a further longitudinal position. It has been usual practice heretofore to saw through a pressure sewer when a blockage occurs. Sawing through a pressure sewer in which a cable is arranged does however result in the cable also being sawn through. This must not happen. The necessity of sawing through the medium conduit is obviated by the presence of one or more inspection wells. It is very much easier to install such an inspection well prior to drawing of the cable through the medium conduit; such an inspection well is preferably placed by making a longitudinal opening in the pipe and then placing the inspection well.

In yet another embodiment a flushing tap is present at a further longitudinal position on the medium conduit. A flushing tap is intended for the purpose of flushing clean a part of the pressure sewer. The flushing tap can also be used as inspection well, and is or can be provided with auxiliary means with which a cable is introduced into the medium conduit, particularly provided with a pulling member which is displaced by the pressure in the medium conduit, such as the liquid pressure generator. It is particularly favourable when the flushing tap is present at the first point and is used to feed liquid, in particular water, into the medium conduit with which said pulling member and the cable are displaced. Instead of having an explicit coupling of the flushing tap to a water main, the flushing tap can be coupled to a releasable conduit as for instance applied by the fire services.

It will be apparent that the house connections, i.e. the first passages, are arranged at a desired number of positions on the medium conduit, for instance in a density of 2 to 40 per kilometre. It is favourable for the inspection well to be also arranged at regular distances in the medium conduit, for instance in a density of 0.3 to 3 per kilometre. This is not only favourable with a view to inspection, but is also suitable for an adequate throughfeed of the cable during drawing through the medium conduit.

When the medium conduit has a longer length than the intended distance (for instance 400 metres to 2.5 kilometres) spanned between the first and the second point, it has been found favourable to nevertheless take the cable out of the medium conduit at the second point. The amount of cable necessary for the distance to a third or fourth point is then temporarily stored on a giant reel. The cable is then fed back into the medium conduit at the second point and guided with the pulling member to the third point. Liquid is preferably added here to the medium conduit from or in the vicinity of the second point. Using this method there is sufficient pressure buildup to displace the cable.

It is noted that it is not precluded that from said second point the cable is guided further outside the medium conduit, and only reintroduced into the medium conduit at a further point.

The invention preferably makes use of a pulling member at the outer end of the cable which provides for buildup of liquid pressure if necessary. This pulling member is also referred to as a liquid pressure generator. This liquid pressure generator has the particular purpose of building up liquid pressure in order to push aside or circumvent possible obstacles. This does however also make it possible for the cable to be carried along substantially by liquid without the necessity of applying additional pressure from the very start.

The liquid pressure generator is particularly provided with an elastic ring. The width of the liquid pressure generator can in this way be automatically adapted to a diameter of the pipe of the medium conduit. An elastic ring is also understood here to mean an elastic cylindrical body. The ring provides a physical obstruction to flow of the medium along the liquid pressure generator without this making the member stiff. This is because stiffness must be avoided so that the pulling member can slide through bends. Modifying the diameter of the pipe is in practice useful in two ways: it may first of all be the case that a single medium conduit comprises pipes of differing diameter. Using an elastic ring it is possible to ensure that sufficient pressure is developed in all pipes. It is then the case that obstruction in a sewer often results in a local constriction of the pipe. The constriction can thus be passed with the elastic ring.

Situated particularly between the elastic ring and a central shaft of the liquid pressure generator is an intermediate body of elastic material, this intermediate body being less elastic than the elastic ring. This reduces the risk of the pulling member breaking up into the central shaft and the elastic ring during use.

It is noted that a liquid pressure generator is an auxiliary means essentially applied only once. If necessary, this auxiliary means can already be replaced when the cable is taken out of the medium conduit at the second point, in other words already during drawing of a single cable in a single medium conduit. The elasticity need thus only be guaranteed for a short period of use; wear is therefore not an essential problem either. In a suitable implementation use is made of foam rubber.

According to a further implementation, the elastic ring of the liquid pressure generator is replaceable. This is then particularly favourable when the auxiliary means is provided with one or more sensors, a transmitter for wireless communication and optionally a receiver. Examples of sensors are cameras, location determining instruments (e.g. based on GPS), acoustic and ultrasonic instruments, temperature sensors, chemical sensors (e.g. for measuring concentrations of determined gases). Such instruments are more preferably placed as far as possible inside the elastic ring, so that the elastic ring also functions as protection for the one or more sensors.

In a further embodiment the liquid pressure generator comprises a layer of water-repellent material. Such a layer can in principle be present on the front side, the rear side and inside the liquid pressure generator. Placing on the rear side would appear favourable, for the purpose of simple manufacture as well as to ensure that the pressure generator is pushed through a constriction by the pressure buildup from the rear. The use of more than one water-repellent layer is not precluded.

BRIEF DESCRIPTION OF THE FIGURES

These and other aspects of the invention will be further elucidated with reference to the following figures, in which:

FIG. 5 shows a component of the shell;

FIG. 6 shows a schematic section of a cable passage;

FIG. 7 shows a first component of the cable passage;

FIG. 8 shows a second component of the cable passage;

FIG. 9 shows a pipe part enclosed by the shell;

FIG. 10 is a schematic side view of the shell and medium conduit;

DETAILED DISCUSSION OF ILLUSTRATIVE EMBODIMENTS

Figure 1:
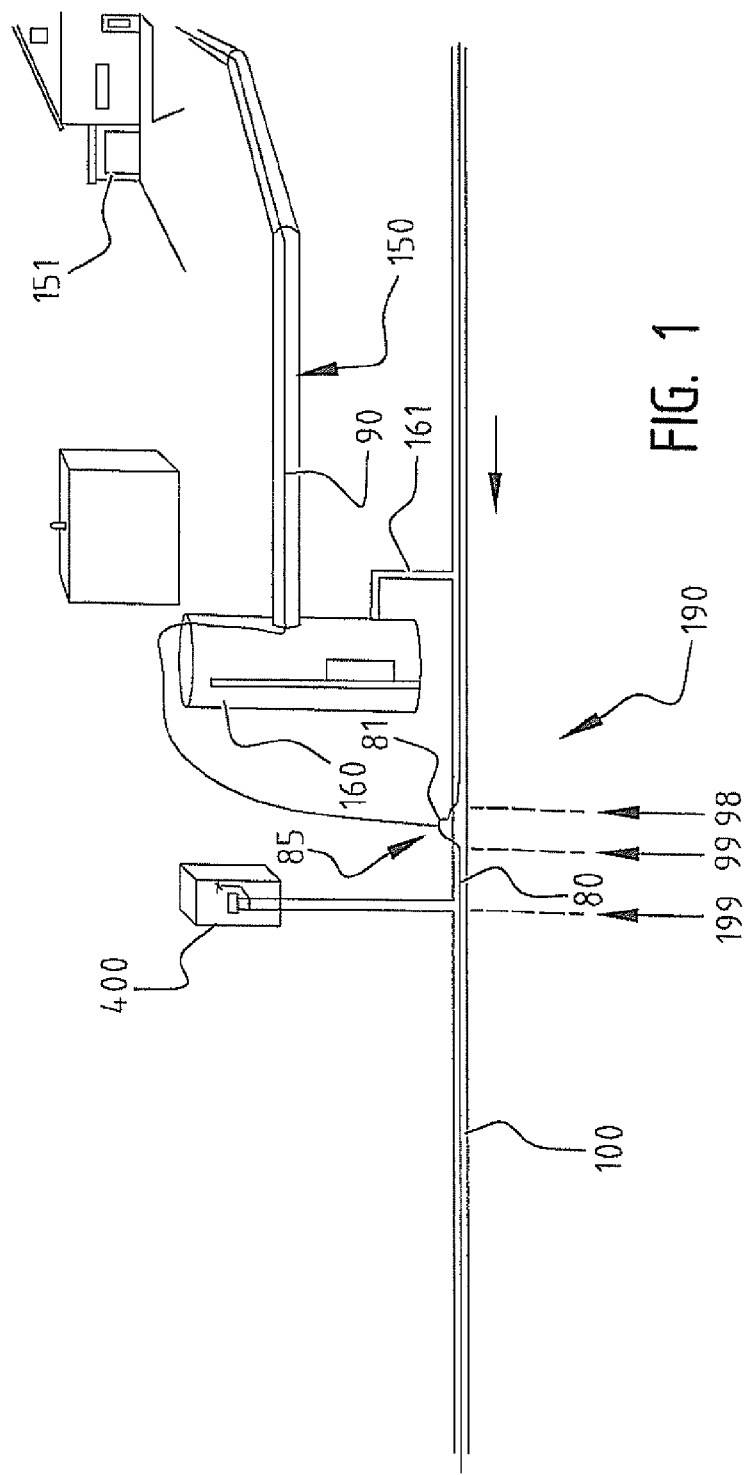
FIG. 1 shows a schematic view of a house connection to the medium conduit according to the invention.

The figures are of schematic nature. Components are not shown to scale. The same or similar elements are designated in different figures with corresponding reference numerals.

FIG. 1 is a schematic view of a house connection 190 to medium conduit 100 according to the invention. In this embodiment medium conduit 100 is a pressure sewer. Not otherwise precluded is that the invention is applied to another type of medium conduit, such as a water conduit, a district heating system based on conduits with hot water or hot air, a gas conduit. The medium conduit is suitable for transporting a medium using pressure, wherein it is not necessary for the pressure to be continuously present; pressure sewers are for instance usually operated by a number of pumps which are only activated at regular or irregular times. The terms 'pressure sewer' and 'medium conduit' will be used interchangeably. The medium flows in the medium conduit in the direction indicated by the arrow. The initial purpose of a pressure sewer is to flush away excreta, surplus water and the like using pressure. The mass for flushing away is transferred for this purpose from a dwelling 151 via a house connection pipe 150 to a catch pit 160. When catch pit 160 has been filled to a certain level, it is emptied via channel 161 into medium conduit 100 in which the mass is displaced by means of pressure.

A communication cable 80, in particular a glass fibre cable, is arranged in medium conduit 100 so that no separate trenches need be dug for this glass fibre cable. Communication cable 80 will be referred to simply as cable hereinbelow. The use of the same system for other cables such as electricity cables is not precluded. Although reference is made in general sense here to cable 80, it is recommended that cable 80 comprises a set of individual cables, each intended for an individual connection. The signals from the individual cables are then transmitted in known manner at a collection point, i.e. by means of modulation, to a or a limited number of optical lines and thus transmitted further. Not precluded is that such a modulation step already takes place closer to dwelling 151, for instance at house connection 190. This is specifically effective when the number of connections becomes very high, so that a single cable 80 in the medium conduit can no longer comprise the individual cables.

A house connection 190 is required to connect dwelling 151 to cable 80 in medium conduit 100. A portion 81 of cable 80 is taken out of the medium conduit at a first longitudinal position 98 via a first cable passage, as will be further discussed with reference to FIG. 3 and following. The cable is reintroduced into medium conduit 100 via a second cable passage at a second longitudinal position 99. The mutual distance between the first and the second longitudinal positions 98, 99 is very short. The distance is typically less than one metre, while medium conduit 100 as a whole is kilometres long. A connecting cable 90 is connected via a weld 85 to the exposed portion 81 of cable 80. In this example the house connecting cable 90 is guided further to dwelling 151 via house connecting pipe 150. This is of course not essential, though is deemed favourable. An inspection well 400 is situated at a further longitudinal position 199 located downstream of the first and the second longitudinal positions 98, 99. This inspection well can be used for different functions, i.e. as cable inlet, as flushing tap and as inspection well for the state of the sewer itself.

Figure 2:
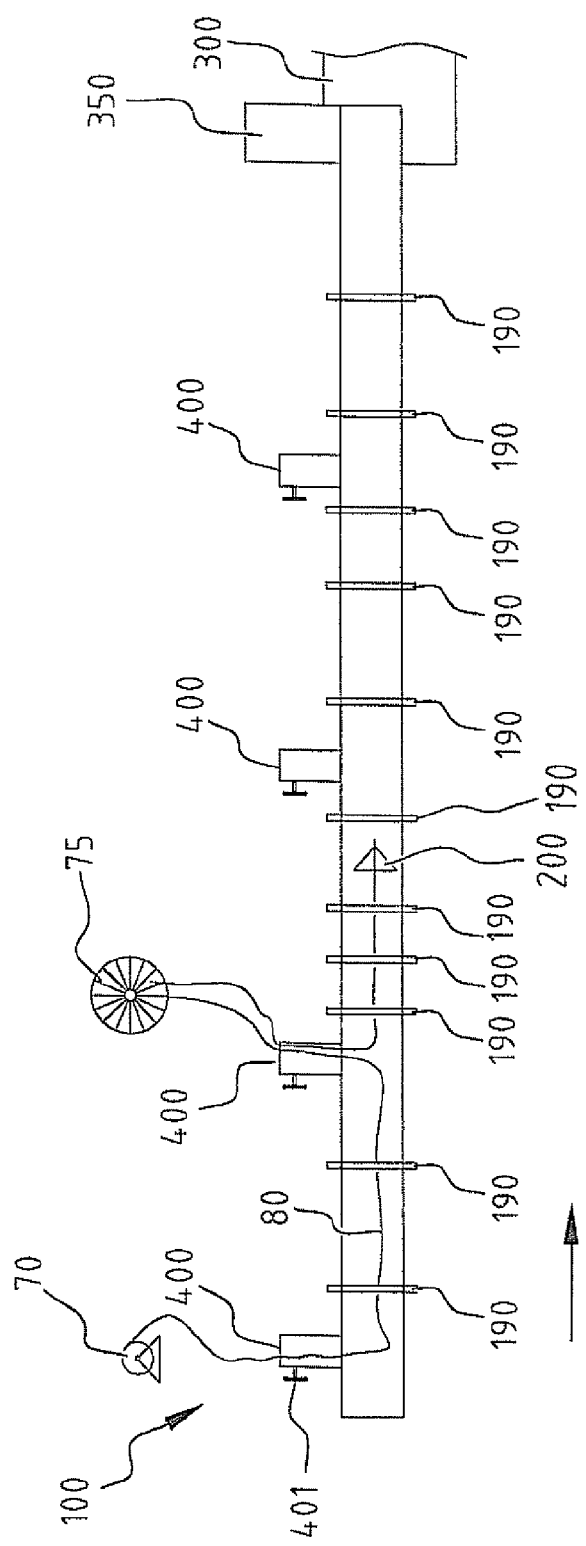
FIG. 2 shows a schematic view of the medium conduit.

FIG. 2 is a schematic view of medium conduit 100 in a more abstract form. The flow direction is once again indicated here with the arrow. This FIG. 2 shows a plurality of house connections 190 and a number of inspection wells 400. Also shown is the end point of pressure sewer 100, in this example the transition to a conventional sewer 300 which operates without pressure. An inspection well 350 is coupled to this transition. Normally the location of house connections 190 is substantially determined by the location of the dwellings for connection, so that the distance between house connections 190 is not or need not be constant. It is noted that, during installation or modification of this medium conduit 100 suitable for cables, additional house connections 190 can be drawn which do not correspond to existing dwellings. It has been found favourable for the inspection wells 200 to be arranged at a regular distance from each other. This is because cable 80 is guided through medium conduit 100 by means of a parachute 200 on the basis of the pressure present therein. When the distance between inspection wells 400 becomes too great, it is found more difficult to guide cable 80 with sufficient speed through the medium conduit. Inspection moreover has to be carried out by placing a camera in medium conduit 100 via this inspection well 400. It is here also the case that too great a mutual distance limits reliability. Coupled to the inspection well is a flushing tap 401 which can be used to flush the medium conduit, but also to provide liquid with which the cable can be pulled through the medium conduit. Not otherwise precluded is that different wells be arranged for various purposes, although this is not a model of efficiency. It is not precluded that the number of flushing taps 401 is smaller than the number of inspection wells 400. The flushing tap 401 can be connected directly to a water main but can also be connected to a local water tank, for instance a mobile water tank, such as a truck provided with a water reservoir. Use can be made of rainwater or other liquid instead of pure water. Determined ingredients can optionally be added to the water so that a cleaning of the medium conduit, in particular sewer, takes place when cable 80 is introduced. Flushing tap 401 can supply liquid under pressure. It is otherwise possible for one or more of the pumps possibly present in or on the medium conduit (particularly pumps of the pressure sewer) to be applied in order to provide the pressure.

When being laid, cable 80 is drawn off a reel 70. Cable 80 is then taken out of medium conduit 100 at the first inspection well 401 and wound onto a reel 75. Use is made here of one or more specific reels suitable for carrying kilometres of cable. Cable 80 is then reintroduced into medium conduit 100 and guided further. It is noted that house connections 190 and inspection wells 400 are already present before introduction of cable 80. After cable 80 has been carried through from a first point to a second point cable 80 is taken out of medium conduit 100 at a house connection 190. Cable 80 has to be laid at an appropriate location inside medium conduit 100, this taking place according to the invention using the cable passages. Use can be made of hooks or other tools to guide cable 80 out of pressure sewer 100 into the cable passages. This can take place despite the fact that the system is under pressure and an open connection will thus result in mass spraying out of medium conduit 100. The presence of flushing tap 401 first of all makes it possible to flush with water during drawing of cable 80. This already limits to some extent the foul nature of any spraying mass. After drawing of the cable from a first to a subsequent inspection well 400 the pressure can then be temporarily relieved. It is then possible to fish cable 80 out of pressure sewer 100. It is noted that variations to this specific laying method are possible within the invention.

For the purpose of drawing the cable 80 use is preferably made of a pulling member 200. Specific examples of pulling members 200 are known from the British patent application GB 2312995A. A first example is spreadable and has the form of an umbrella. The operation is rather more similar to a sail of a sailing vessel: pressure from behind, particularly in the form of a gas or vapour, is blown into the umbrella whereby it moves forward. In the case of a constriction the umbrella will first collide with the element causing the constriction. It is unclear whether the umbrella can then still be collapsed. Whether the pulling member can pass through the constriction cannot be inferred from the example. The stiffness which appears to be desirable for proper operation of the umbrella would seem to be incompatible with such maneuverability; it is possible to envisage the umbrella lying at an angle upstream of the constriction but not passing through the constriction. A second example is an inflatable balloon. GB 2312995 shows that the balloon can be inflated and opened from the passage using a cord. This would seem to require an ingenious system which is not however described. A balloon moreover appears to absorb much less pressure than the umbrella. It is not clear whether the cable is sufficiently displaced with a balloon as pulling member.

Figure 3:
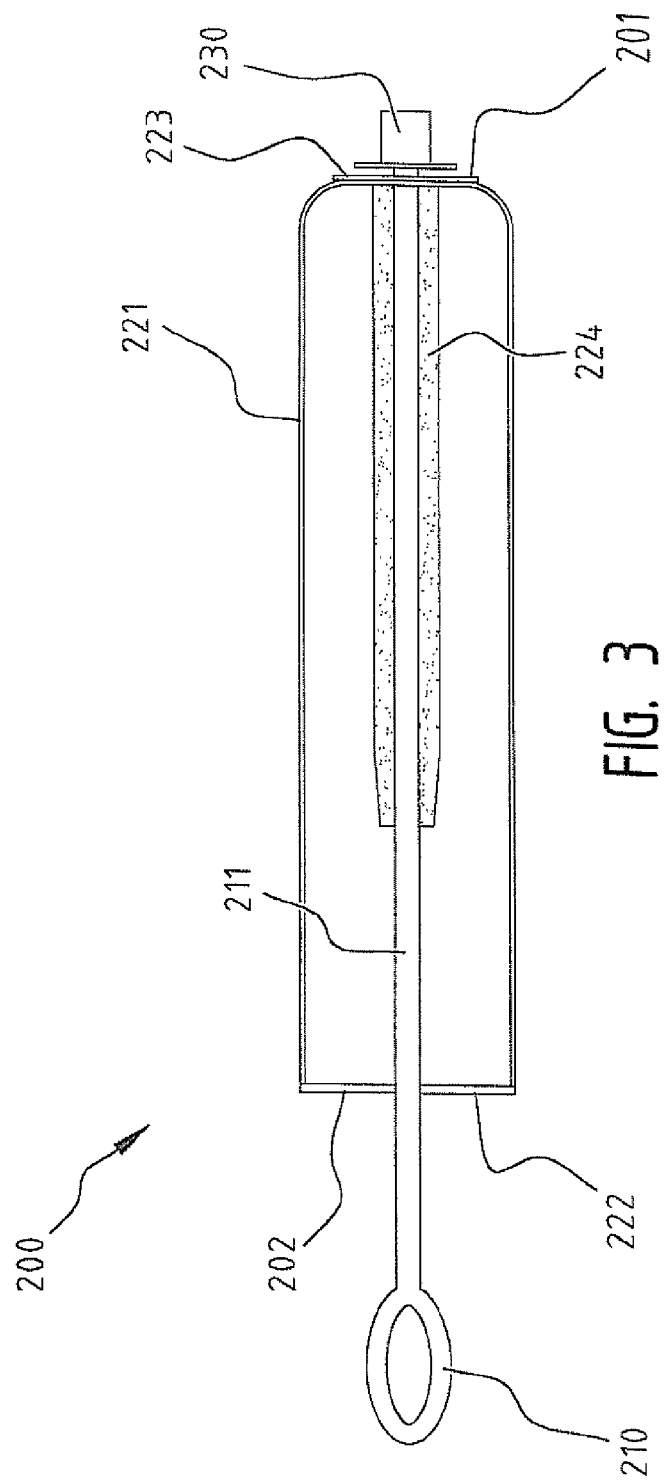
FIG. 3 is a schematic side view of the liquid pressure generator according to the invention.

FIG. 3 shows a schematic section of a pulling member 200 according to the invention. This pulling member 200 is a liquid pressure generator; it is suitable for advancing the cable in water or an aqueous medium, wherein the overpressure is normally much less great than the overpressure in a gas conduit. Pulling member 200 is also designed to pass through constrictions and bends in the medium conduit. The pulling member comprises a central shaft 211 formed from flexible material to which an eye 210 is connected for coupling of the cable. This eye is situated on a rear side 202 of pulling member 200. The front side 201 of the pulling member can comprise a head 230 in which for instance a camera is encased. A pressure distributing ring 223 is also present in this example. Arranged around central shaft 211 is an elastic ring 221 having on the rear side 202 a layer of water-repellent material 222. The elastic ring 221 is for instance designed to be suitable for a medium conduit with a diameter of 2-20 cm, in particular 4-12 cm. The elasticity is particularly such here that pulling member 200 can also pass through a constriction or bend in a narrow pipe.

An intermediate body 224 of elastic material is present between central shaft 211 and elastic ring 221. Intermediate body 224 is effectively less elastic than elastic ring 221. Elastic ring 221 in particular, and preferably also intermediate body 224 are porous in order to increase the compressibility. It is desirable here for the porosity of intermediate body 224 to be lower than the porosity of elastic ring 221. Intermediate body 224 is also intended for the purpose of improving the adhesion of central shaft 211 to elastic ring 221. This adhesion is particularly desirable to prevent the elastic ring 221 remaining jammed against the pipe wall while the central shaft 211 breaks loose and shoots forward. The risk of such a release occurs particularly in the case of constriction or sharp bends. The intermediate body preferably extends for this purpose over a considerable portion of the length of the pulling member, for instance at least 30% and more preferably at least 50%. This considerable portion is situated here particularly on the front side of the pulling member as shown in FIG. 3. The intermediate body is preferably provided with a rough outer side. Rough is here understood to mean non-smooth, and in particular that the intermediate body does not have a purely cylindrical form. The intermediate body is particularly anchored in central shaft 211 and/or in elastic ring 221. Such an anchoring in for instance central shaft 211 can be achieved by making the central shaft in a determined form with an injection moulding technique, after which the intermediate body is arranged with a suitable manufacturing technique, such as injection moulding, coating, arranging as foil which is heated wherein it melts, and so on. The intermediate body can of course also be arranged here as a sequence of layers, wherein variation in the composition of the layers is not precluded. A very favourable manner of improving adhesion between intermediate body 224 and elastic ring 221 is to further arrange a specific adhesion layer which provides particularly for cross-linking of at least apart of intermediate body 224 (the 'outer side') with at least a part of the elastic ring (the 'inner side'). Suitable materials for such an adhesion layer and processes for adhesion will be per se known to the skilled person in the field of polymeric materials. Polyacrylate resins can be envisaged here. Central shaft 211 preferably extends over the whole length of the liquid pressure generator, although this is not strictly necessary. When the medium conduit is very clean and reliable (such as for instance a water conduit or a sewer that has not yet been taken into use), it is possible to suffice with a simpler variant, wherein for instance intermediate body 224 is absent and/or central shaft 211 does not run wholly through pulling member 200. The liquid pressure generator can also be designed such that elastic ring 221 extends beyond the rear of central shaft 211 and for instance provides for a partial or complete encasing of eye 210 (or a means embodied in other manner for coupling of the cable). This may for instance be favourable when the water-repellent layer 222 is embodied as a body, for instance a cap-like body. Such a form can be favourable in ensuring that pressure is exerted on both the flexible central shaft 211 and the elastic ring 221 when pulling member 200 is situated upstream of a constriction in the pipe. It is not even precluded that the cable and the eye 210 are connected to such a water-repellent body 222, which is connected in turn to central shaft 211 and elastic ring 221. It can likewise be the case that such a water-repellent body 222 is integrated with central shaft 211, in particular that it is formed as a single component in a combined manufacture (such as for instance injection moulding). It is however desirable in such embodiments that the water-repellent body 222 has sufficient flexibility in a direction away from central shaft 211 and has or can take on a substantially oval form such that, if the elastic ring 221 expands, the water-repellent body 222 acquires a greater diameter and can ensure that sufficient water is held back for the purpose of developing sufficient liquid pressure.

The pulling member 200 shown in FIG. 3 has a head 230, preferably provided with a camera and optionally a transmitter. Accommodation of such electronic devices in central shaft 211, elastic ring 221 and/or intermediate body 224 is not precluded. The intermediate body 224 in particular appears to be highly suitable as an envelope for electronic components and/or devices because the electrical devices need then only be arranged after forming of central shaft 211 and because the material of the intermediate body can be selected such that a sufficiently sealed envelope and protection are ensured. If desired, central shaft 211 can be provided with a cavity suitable for the placing of one or more electronic devices. Head 230 can be received in the central shaft (i.e. manufactured as a single component). Head 230 can optionally also be removed, although it is favourable for the liquid dynamics if the front side has in cross-section a roughly parabolic form or a pointed form. Examples of electronic devices are cameras, wireless transmitter, wireless receivers, devices for position determination (e.g. according to the GPS system), sensors such as temperature sensors, sensors for measuring gases and/or concentrations of gases or constituents in solution, acoustic sensors and so forth. It will be apparent to the skilled person that intermediate body 224, central shaft 211 and/or elastic ring 221 can be adapted for an optimum design of the electronic devices, for instance through the design of channels and/or cavity. An antenna for a wireless transmitter and/or receiver can moreover be arranged on or in central shaft 211 so that the antenna has sufficient size to enable an adequate wireless reception through the ground (and pipe wall of the medium conduit).

Figure 4:
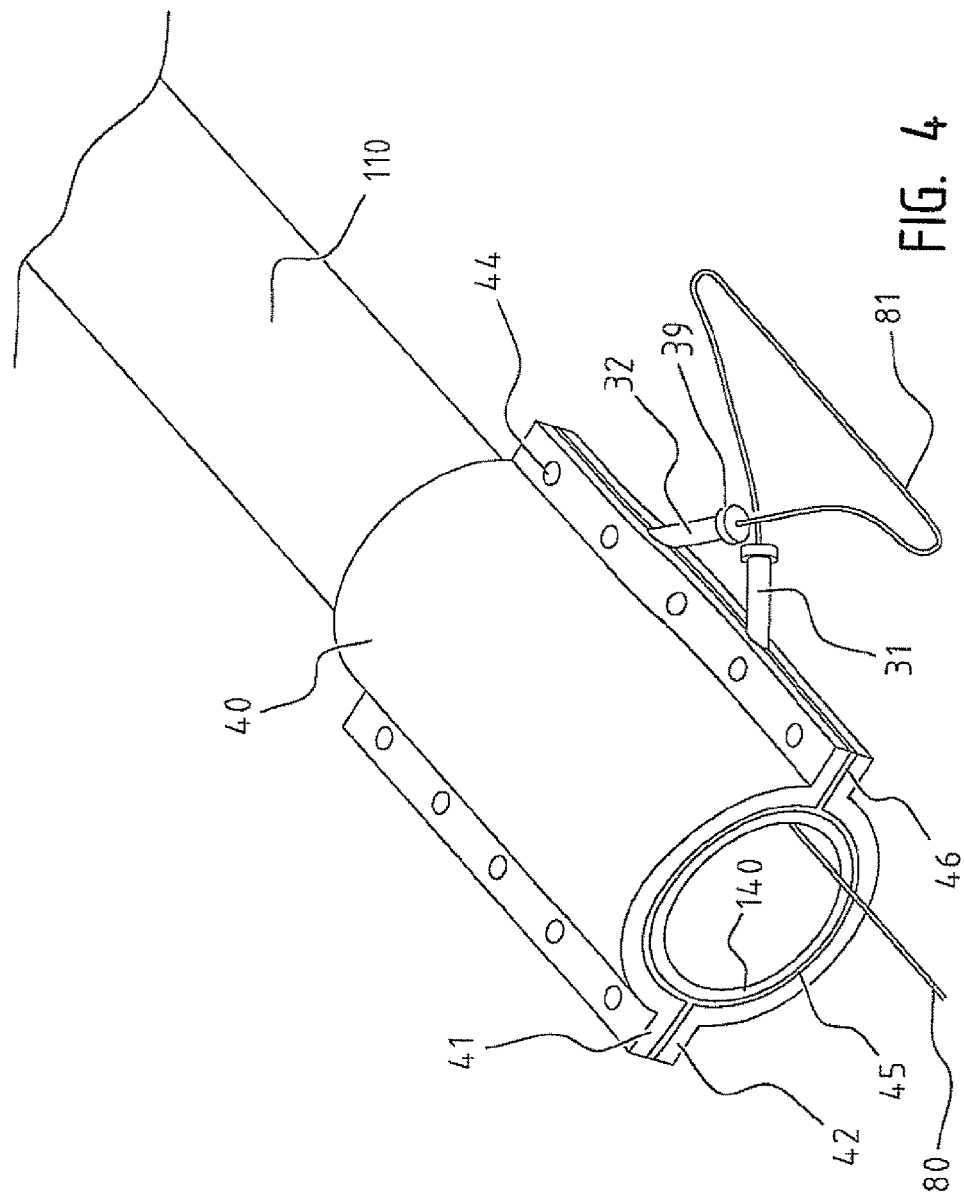
FIG. 4 is an aerial perspective view of the shell with cable passages.

It is noted that the system shown in FIG. 1-5 of the British patent application GB 2312995 differs considerably in essence from that according to the invention. It shows a conduit with a valve around which a cable is guided. The pulling members of the British patent application are collapsible so that they can pass through a cable passage. The cable appears to lie loosely in the pipe and is not positioned in any way at all in the pipe, and is lifted at a cable passage wherein it crosses through the pipe in vertical direction. The opening in the pipe is closed with a saddle piece. That the cable lies loosely need not be a problem in gas conduits, but in medium conduits for liquid and possibly solid constituents this soon results in problems: blockages can occur or, alternatively, pressure on the solid constituents can entrain the loose cable, with breakage as likely result. Breakage is likewise not unlikely when the pulling member is lifted upward through the cable passage as shown in FIG. 4 of the British patent application, wherein the cable effectively forms a very tight loop in the cable passage. In the context of the use of glass fibre cable breakage is not only undesirable because of the complication that individual cables in the cable must be manually connected to each other once the location of the break has been found. Such a breakage is also undesirable because a coupling increases the internal resistance of the glass fibre cable, and thereby reduces the quality of transmission of communication signals (often expressed as the signal-noise ratio).

FIG. 4 shows a part of medium conduit 100 which functions as manifold with both the first and the second cable passage 31, 32. FIG. 10 shows a schematic side view. Medium conduit 100 comprises in this example a pipe 110. A portion is removed from pipe 110, thereby creating a longitudinal opening between a first pipe part 111 and a second pipe part 112. A shell 40 is placed in the longitudinal opening on pipe 110 (or pipe parts 111, 112). Shell 40 is attached to pipe parts 111, 112 with sliding sleeves 115. A loop 81 in cable 80 is situated outside the pipe. A first and second cable passage make it possible for cable 80 to leave shell 40 without liquid beginning to leak or even spraying out of the pipe.

As shown in more detail in FIG. 4, shell 40 comprises a first half 41 and a second half 42 which in this embodiment both cover 180 degrees. This is by no means essential however. The two halves 41, 42 of shell 40 are fixed to each other with a usual and reliable fastening means 44. A sealing means 46 is present to prevent leakage. Use is made in this example of a connection with nuts and bolts. In this example the shell covers a pipe part 140 which is provided with an opening (see FIG. 9). A sealing ring 45, for instance of rubber, provides for a suitable sealing between pipe part 140 and shell 40. Cable passages 31, 32 lie at an angle to the axis of pipe 110, this angle preferably being less than 60 degrees, more preferably less than 45 degrees. Cable passages 31, 32 are provided with a liquid closure 39. The use of a shell comprising two halves 41, 42 is favourable since at least a portion of cable passages 31, 32 can thus be embodied as profile in the halves. Pipe 110 and shell 40 can be formed from conventional construction materials suitable for use in the medium conduits. Known materials are concrete, construction plastics such as polyethylene, polyvinyl chloride, stainless steel and so on. Shell 40 can be mounted rotatably on pipe 110, for instance through the use of sliding sleeves, as is known to the skilled person. Such a construction has the additional advantage that the manifold can be placed in simple manner between a first and a second pipe part of pipe 110, i.e. shell 40 can be pushed under or over a pipe part and then back again in the other direction.

FIG. 5 is a schematic side view of a first half 41 of the shell with cable passages 31, 32. Shown here is that cable passages 31, 32 are constructed from two parts, each coupled to a half 41 of the shell. This construction forms a specific implementation of a favourable embodiment according to the invention. According to this embodiment, the first cable passage is part of a manifold covering an opening in the pipe. The manifold comprises a first and a second component with a mutual surface extending in a longitudinal direction through the first cable passage. The design is such that, in order to carry the cable into the first cable passage, the cable is placed in the first component of the manifold, after which the second component is secured to the first component and closes the surface of the first cable passage in its longitudinal direction. In the implementation according to FIG. 5 the shell forms the manifold. The first half 41 of the shell is here the first component and the second half of the shell is the second component of the manifold. Cable 80 is laid in the first half 41, after which the second half of shell 40 is placed in a manner such that the surface between the first and the second half is closed. This creates a cable passage which in this example encloses the cable as a ring. Fixing of the first half to the second half takes place in this embodiment with nuts and bolts. The further components of the cable passage as shown in FIG. 6-8 likewise have an exposed surface in the longitudinal direction (i.e. a groove) through which the cable can be drawn. Where the first and the second component here each form a half, the second component can also simply be a rubber element which closes a groove or incision in the cable passage. Nor is it precluded that the second component is an adhesive layer applied to the first component once the cable has been laid in the cable passage.

FIG. 6 shows a schematic section of the first cable passage 31 connected to shell 40. FIGS. 7 and 8 show components thereof in more detail. Shell 40 is situated here between a first pipe part 111 and a second pipe part 112 and is mounted rotatably on these pipe parts 111, 112 with sliding sleeves 115. Cable passage 31 encloses an angle α with the axis through the pipe. Cable passage 31 is provided with a cable tensioner with which cable 80 is tensioned along a wall of the pipe. This prevents the cable causing blockages. The cable tensioner comprises a means 38 for securing the cable 80 and a means 37 for tightening the cable 80. It is noted that the tightening means 37 can also be a motor or a pulley, and need not necessarily be fixed to cable passage 31. In this example both means 37, 38 comprise gaps 37A, 38A with which the means can be placed around the uninterrupted cable 80. Applied in this example for means 37 is a screw turnbuckle, and for means 38 a clamping bush fitting. FIG. 8 also shows a ring 39, a number of which are applied in the liquid closure. This ring 39 is also provided with a gap 39A. The rings are placed inside the screw turnbuckle 38 and downstream of clamping bush fitting 37.

FIG. 9 shows in more detail the pipe part 140 covered by shell 40 (not shown in FIG. 8). Use of such a concealed pipe part 140 has the first advantage that the mechanical and thermomechanical properties of the shell plus pipe part are highly similar to the rest of pipe 110. This corresponds to existing practice, experience and patterns of expectation in the field. A second advantage is that a double closure is created, this reducing the risk of leakage. The shell can be embodied here in a relatively fine material, whereby the two halves of the shell can fit together well. A further advantage is that there is only an opening 141 of limited size. When the shell is temporarily removed or opened in order to take out the cable 80, and there is still liquid present in the medium conduit, this liquid will not immediately flow into the ground, or cause a small overflow or pool of sludge, but will only be able to exit via the opening. Since the opening 141 for taking out the cable is preferably rotated to a servicing position on the upper side, the liquid will in this case remain inside the pipe. Opening 141 extends particularly in the axial direction. The length of the opening determines the space for forming of the loop; too small a length results in the possible risk of kinking and breaking of the cable; too great a length makes it more difficult to completely prevent leakage. Arranged in the pipe part in a specific embodiment is a channel which is suitable for guiding the cable. The channel particularly forms a cavity which debouches in opening 141. Such a channel is an additional aid for positioning the cable in the desired radial position in the pipe.

Figure 12:
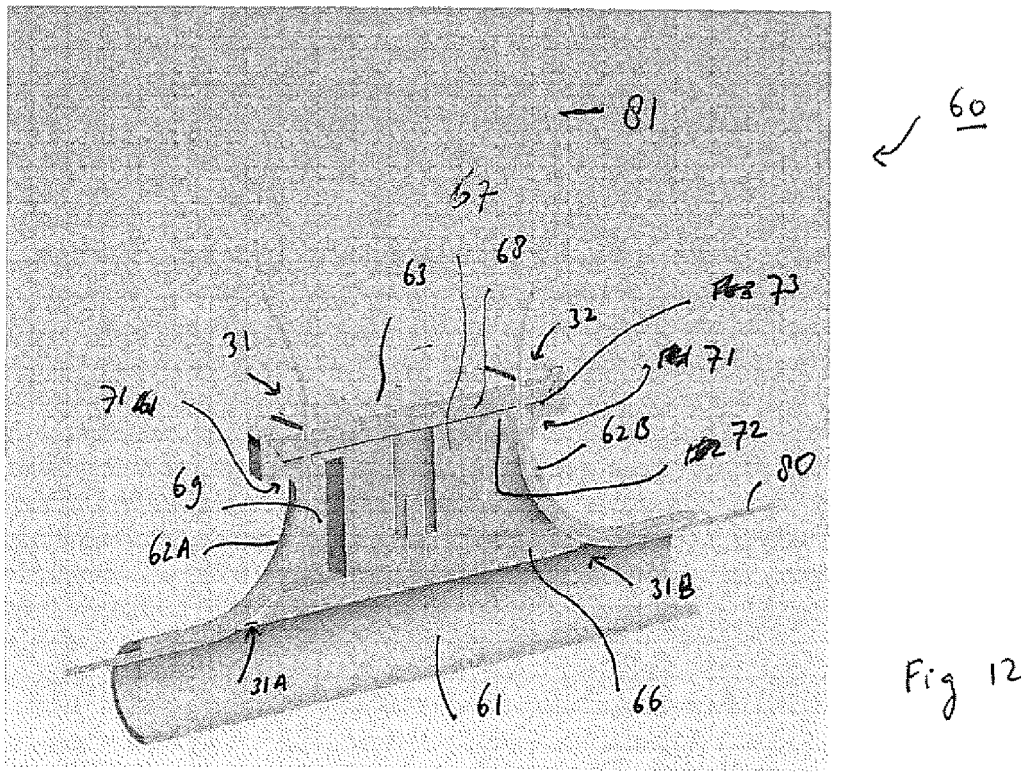
FIG. 12 is a schematic section of the segment shown in FIG. 11.
Figure 11:
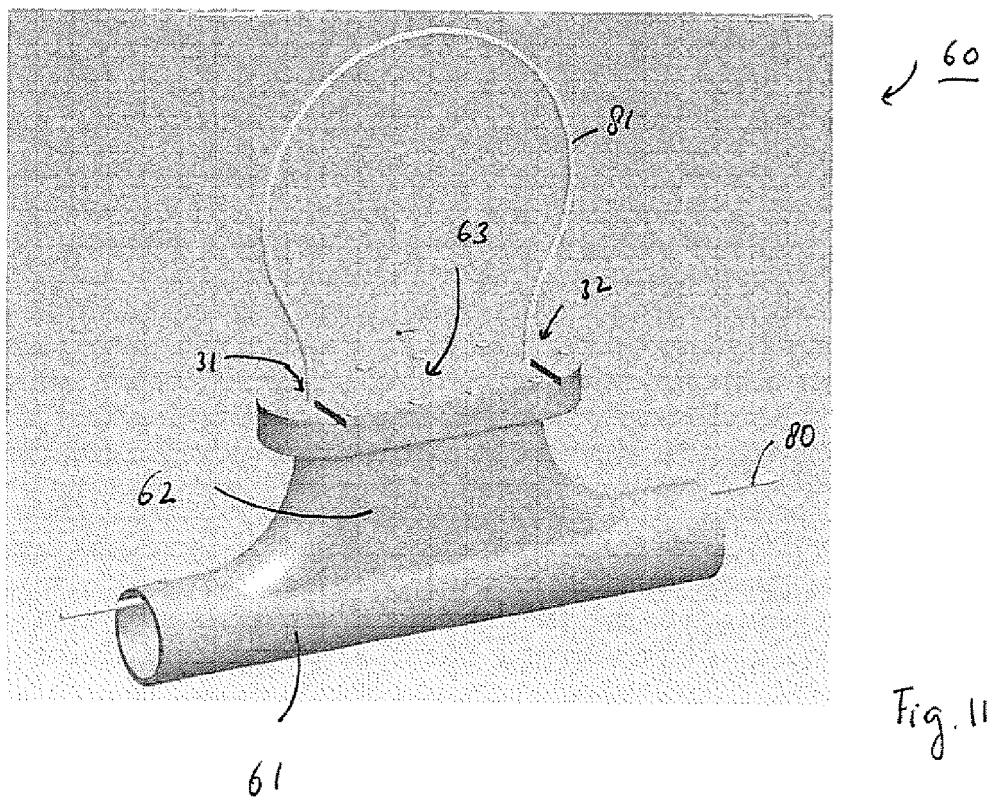
FIG. 11 is a schematic side view of a segment placeable in a medium conduit.

FIG. 11 is a schematic side view of a segment 60 placeable in a medium conduit according to the invention. FIG. 12 shows a schematic section corresponding to FIG. 11. It is noted that only a single embodiment of segment 60 is shown here and that variations are very well possible.

Segment 60 according to FIG. 11 comprises a pipe part 60, a neck 62 and a cover 63. A first and a second cable passage 31 32, here in the form of grooves, are arranged in cover 63. As shown in FIG. 11, it is not necessary for the grooves to wholly transect the cover. A cable 80 is guided through cable passages 31, 32 so as to form a loop 81. As stated above, loop 81 can be used to define a house connection. If desired, a cable tensioner can be arranged on cover 63 with which the cable can be tensioned in the pipe part and the pipe connected thereto. Owing to the cable tensioner the loop 81 in cable 80 can have a variable length without cable 80 hanging loosely in the pipe. Pipe part 61 is for instance connected with sliding sleeves to the pipe (not shown), whereby a rotation from a protected position to a servicing position is possible. The position show in FIG. 10 and FIG. 11 is the servicing position.

The section of FIG. 12 shows the structure of segment 60 in detail. Different design requirements are taken into account in the design of segment 60. A first requirement is that cable 80 be guided out of pipe part 61 to the outside. This is fulfilled by the choice of the form of neck 62, wherein the side parts 62A, 62B effectively guide the cable.

A pipe closure 66 of pipe part 61 is further formed. This pipe closure 66 takes a form corresponding if possible to the form of an inner wall of pipe part 61. The advantage hereof is that objects such as pulling members, cleaning elements and test elements will flow normally past neck 62 without moving out of their path.

Situated between the side wall of neck 62 and pipe closure 66 are openings 31A, 32A which are suitable and intended for passage of cable 80. The sides of pipe closure 66 are formed for a good connection. The opening taking the form of a groove into which the cable fits is not precluded.

In the shown embodiment the pipe closure 66 as an upright part so that the closure is particularly T-shaped. This appears to be a suitable implementation for connecting pipe closure 66 and spacer 67 to each other. The division into a pipe closure 66 and a spacer 67 is prompted by assembly reasons, in particular that pipe closure 66 is first inserted into the segment at the top via the opening, then placed in the desired position and orientation and subsequently connected to the subsequently inserted spacer 67. Diverse mechanisms are suitable as connecting mechanism, such as a snap mechanism, a connection with screws, bolts or even an adhesive connection.

Spacer 67 is formed here in a U-shape. In a favourable embodiment spacer 67 is formed as one whole, although the two legs of the U-shape being separate parts is not precluded. Nor is a form other than a U-shape precluded. An additional advantage of the U-shape is the presence of a cavity 69. When space is left between the pipe closure and the side wall of the neck (i.e. at openings 31A, 31B), this cavity 69 provides the additional advantage of compensating a pressure difference between the pipe and the outside pressure.

Spacer 67 is provided in this embodiment with an upper plate 72 which fits into a cavity 73 in a protrusion 71 on neck 62. Upper plate 73 hereby rests in stable manner against neck 62. Pressure can thus be exerted from above for a closing fit of the cover and to close the opening of segment 60. Use is preferably made for this purpose of a deformable element 68, for instance of rubber-elastic material. Cover 63 itself is then placed thereon and preferably secured in known manner. The cover is typically made from a construction material such as stainless steel. Neck 62 and pipe part 61 are for instance made from a plastic, although other materials known in the art can likewise be applied.

Figure 14:
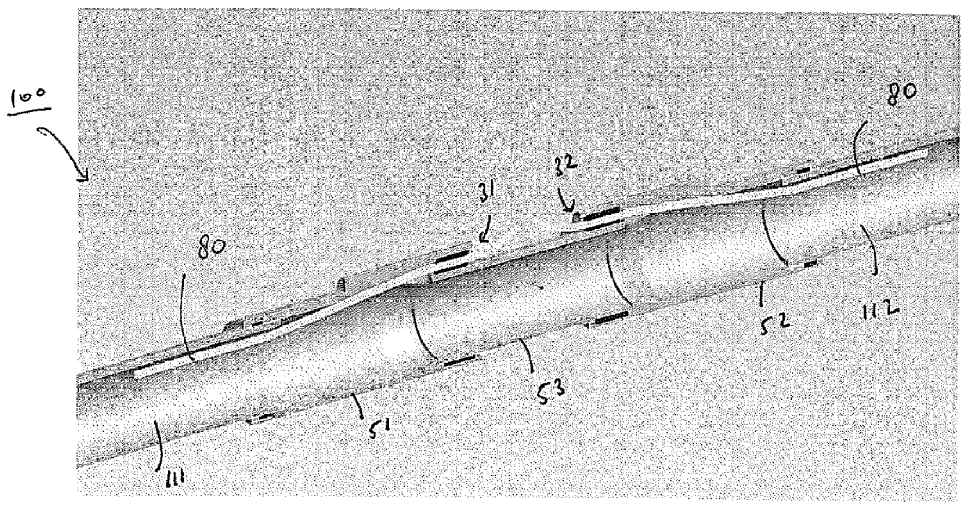
FIG. 14 is a schematic section of the medium conduit shown in FIG. 13.
Figure 13:
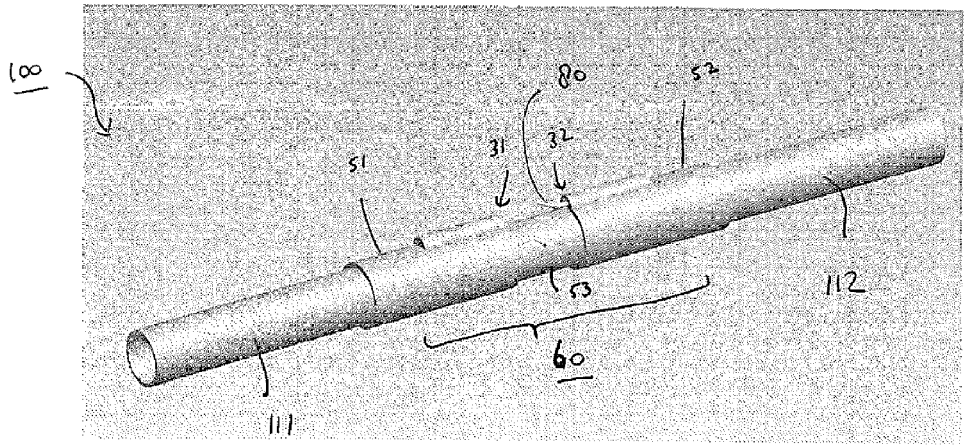
FIG. 13 is a schematic side view of a medium conduit with shell placed therein.

FIGS. 13 and 14 show a further embodiment of a medium conduit 100 which can be deemed as a variant of the embodiment shown in FIG. 9. In this embodiment the segment 60 effectively comprises a first shell 51, a second shell 52 and a pipe part 53 therebetween. Fixed to first shell 51 is a first cable passage 31; fixed to second shell 52 is a second cable passage 32. In this embodiment the connection of first shell 51 to first pipe part 111 and of second shell 52 to second pipe part 112 is such that segment 60 can be rotated from a protected position to a servicing position.

FIGS. 13 and 14 show no further cable guide than that defined by the form of cable passages 31, 32. Nor is a cable tensioner shown. Specific cable guides and one or more cable tensioners can also be arranged if desired.

The invention claimed is:

1. Liquid pressure generator suitable for coupling to a cable, in particular the outer end of a cable, with which a cable can be drawn in a pipe of a medium conduit and the cable can be displaced in the pipe through the medium conduit through buildup of liquid pressure downstream of the liquid pressure generator, which liquid pressure generator comprises a central shaft and comprises an elastic ring therearound with which a diameter of the liquid pressure generator can be adapted to a diameter of the pipe of the medium conduit, characterized in that an intermediate body of elastic material is present between the central shaft and the elastic ring, the intermediate body being less elastic than the elastic ring,
    wherein the liquid pressure generator comprises a sensor and a transmitter for wireless communication.

2. Liquid pressure generator as claimed in claim 1, provided with a water-repellent layer which forms a barrier to flow of liquid through the liquid pressure generator.

3. Liquid pressure generator as claimed in claim 1, wherein the intermediate body forms an envelope for electronics of the sensor and/or the transmitter.

4. Liquid pressure generator as claimed in claim 1, characterized in that the elastic ring is replaceable after use.

5. Liquid pressure generator as claimed in claim 1, wherein the intermediate body extends over at least 30% of the length of the liquid pressure generator.

6. Assembly of liquid pressure generator as claimed in claim 1 and a cable.

7. Use of a liquid pressure generator as claimed in claim 1 for guiding a cable through a medium conduit.

* * * * *